Patented Mar. 7, 1950

2,499,920

UNITED STATES PATENT OFFICE 2,499,920

ARYL-SUBSTITUTED VALERIC ACIDS

James H. Hunter and Jerome Korman, Kalamazoo, Mich., assignors to The Upjohn Company, Kalamazoo, Mich., a corporation of Michigan No Drawing. Application April 30, 1948, Serial No. 24,413

7 Claims. (Cl. 260—520)

The present invention relates to α,β-diaryl-aliphatic acids, esters thereof, and intermediates useful in the preparation of the said acids and esters. The invention is further concerned with a process for the preparation of the said acids.

The novel compounds of the present invention have the general formula:

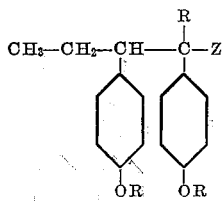

wherein R is selected from hydrogen and methyl radicals, and wherein Z is selected from cyano, carboxy, and carbolkoxy. The number of carbon atoms in the alkoxy part of the carbalkoxy radicals may be from one to eight, inclusive, representative groups being, for example, carbomethoxy (—COOCH₃), carbethoxy (—COOC₂H₅), carbopropoxy (—COOC₃H₇), carboisopropoxy

[—COOCH(CH₃)₂]

and the like.

It is an object of this invention to provide certain aryl-substituted valeric acids, esters thereof, and intermediates useful in the preparation of the acids and esters. The compounds are useful as chemical intermediates and as therapeutically-active substances.

It is a further object of this invention to prepare α-methyl-α,β-di-(p-hydroxyphenyl)-valeric acid, having estrogenic activity.

It is an additional object to provide a method whereby a α-methyl-α,β-di(p-hydroxyphenyl)-valeric acid and similar aryl-substituted valeric acids may be prepared.

Other objects of this invention wil become apparent hereinafter.

The compounds may be prepared by the following sequence of reactions:

(a) 4,4'-Dimethoxy-α-cyanostilbene is reacted with an ethylmagnesium halide, preferably the bromide or chloride, in ether solution to produce α,β-di-(p-methoxyphenyl)-valeronitrile.

(b) The nitrile is hydrolyzed with aqueous alkali, e. g., sodium hydroxide, to yield di-astereoisomeric α,β-di-(p-methoxyphenyl)-valeric acid. This acid is esterified by conventional procedure, e. g., diazomethane, a dialkyl sulfate, et cetera, to give a lower-alkyl α,β-di-(p-methoxyphenyl)-valerate. The free acid is demethylated, as with pyridine hydrochloride, to yield the α,β-di-(p-hydroxyphenyl)-valeric acid, and subsequently esterified by conventional procedure, e. g., conversion to the acid chloride and reaction with the selected alcohol, to yield lower-alkyl esters thereof, if desired.

(c) The p-methoxy ester from (b) is methylated using a metal alkyl, i. e., triphenylmethyl sodium, and methyl iodide to yield a lower-alkyl α - methyl-α,β-di - (p-methoxyphenyl) - valerate, which is then hydrolyzed with alkali, e. g., NaOH, KOH, to give diastereoisomeric α-methyl-α,β-di-(p-methoxyphenyl)-valeric acid. These isomeric acids may be separated by their varying solubilities in butyl alcohol, if desired.

(d) The acid from (c) is demethylated, e. g., with pyridine hydrochloride, to give the α-methyl-α,β-di-(p-hydroxyphenyl)-valeric acid, which is then reesterified by conventional procedure, e. g., conversion with thionyl chloride to the acid chloride and reaction with alcohol, to produce a lower-alkyl α-methyl-α,β-di-(p-hydroxyphenyl)-valerate, if desired.

For example, ethylmagnesium bromide and 4,4'-dimethoxy-α-cyanostilbene were reacted with each other in ethereal solution to produce α,β-di-(p-methoxyphenyl)-valeronitrile. The nitrile was hydrolyzed by hot aqueous ethyleneglycolic alkali to yield α,β-di-(p-methoxyphenyl)-valeric acid. The disastereoisomeric acids thus produced were separated and the higher-melting isomer esterified. This ester was methylated using triphenylmethyl sodium (to give the α-sodio derivative) and methyl iodide, and the resulting ester hydrolyzed with alcoholic alkali to yield a mixture of isomeric α-methyl-α,β-di-(p-methoxyphenyl)-valeric acids. These isomers were separated by differing solubilities in butyl alcohol. The higher melting isomer was demethylated with pyridine hydrochloride to give α-methyl-α,β-di-(p-hydroxyphenyl)-valeric acid.

The α-methyl-α,β-di-(p-hydroxyphenyl)-valeric acid, when assayed by the Kahnt-Doisy method employing white rats, produced the full estrous response in doses of 20 gamma.

The following examples are illustrative of the present invention but are not to be constructed as limiting.

*Example 1.—α,β-di-(p-methoxyphenyl)-valeronitrile*

To a solution of ethylmagnesium bromide prepared from 4.68 grams of magnesium and 26.5 grams of ethyl bromide in 200 milliliters of anhydrous ether was added in small portions 26.5 grams of 4,4'-dimethoxy-α-cyanostilbene [J. Am. Chem. Soc. 64,885 (1942)]. The mixture was heated under reflux for twenty-four hours, whereafter it was cooled and the Grignard complex decomposed with ice and dilute acetic acid. The ethereal layer was washed with saturated sodium bicarbonate solution, then with water, and dried over sodium sulfate. Removal of the ether gave a viscous red oil. Crystallization of the oil from ethanol gave 10 grams of α,β-di-(p-methoxyphenyl)-valeronitrile, melting at 130-121 degrees centigrade.

*Example 2.—α,β-di-(p-methoxyphenyl)-valeric acid and esters thereof*

A mixture of 12.1 grams of the nitrile, prepared as in Example 1, 4.0 grams of sodium hydroxide, 8.0 milliliters of water and 75 milliliters of ethylene glycol was heated under reflux for thirty-six hours. Ninety milliliters of water was added and the solution filtered while hot. Acidification of the cooled solution with dilute hydrochloric acid yielded a mixture of isomeric acids. Recrystallization from ethyl alcohol gave 4.65 grams of an α,β-di-(p-methoxyphenyl)-valeric acid melting at 177.5-179 degrees centigrade. On treatment with ethereal diazomethane, the methyl ester, melting after crystallization from alcohol at 128.5-130 degrees centigrade, was obtained. The ethyl ester is obtained by conversion of the acid to the acid chloride with SOCl₂ and reaction of ethyl alcohol therewith.

The crude residue from the removal of the acid, melting at 177.5-179 degrees centigrade, after removal of the alcohol, was treated with an ethereal solution of diazomethane. After standing two hours, the ether was removed and the residue crystallized from ethanol to give an isomeric methyl α,β-di-(p-methoxyphenyl)-valerate melting at 93-94.5 degrees centigrade. Upon saponification, the corresponding acid, melting at 163-164.5 degrees centigrade, was isolated.

*Example 3.—α-methyl-α,β-di-(p-methoxyphenyl)-valeric acid and esters thereof*

In a stoppered flask under a nitrogen atmosphere, a solution of 5.0 grams of methyl α,β-di-(p-methoxyphenyl)-valerate, M. P. 128.5-130 degrees centigrade from Example 2, in 50 milliliters of dry ether was mixed with 110 milliliters of an ethereal solution containing 0.00178 mole of triphenylmethyl sodium. After standing for three hours at room temperature, 10 milliliters of methyl iodide was added. The flask was stoppered and allowed to stand overnight. Water and a few drops of glacial acetic acid were then added to the reaction mixture. The ethereal layer was separated, the ether removed and the crude methyl α-methyl-α,β-di-(p-methoxyphenyl)-valerate heated under reflux for twenty-two hours with a solution of 10 grams of potassium hydroxide in 150 milliliters of 95 percent ethyl alcohol. Upon acidification, 4.0 grams of mixed isomeric α-methyl-α,β-di-(p-methoxyphenyl)-valeric acids, melting at 165-175 degrees centigrade, was obtained.

Crystallization of the mixed acids gave a first crop weighing 2.24 grams and melting at 181-182.5 degrees centigrade, and a second crop weighing 0.07 gram melting at 154-156 degrees centigrade. Esters of the acids, e. g., the methyl, ethyl, and propyl α-methyl-α,β-di-(p-methoxyphenyl)-valerates, are obtained by preparing the acid chloride and reacting the appropriate alcohol therewith.

*Example 4.—α-methyl-α,β-di-(p-hydroxyphenyl)-valeric acid and esters thereof*

A mixture of 1.0 gram of α-methyl-α,β-di-(p-methoxyphenyl)-valeric acid, melting at 181-182.5 degrees centigrade, and 25.0 grams of pyridine hydrochloride was heated at 185-195 degrees centigrade for three hours. After cooling, the mixture was dissolved in water and the aqueous solution extracted several times with ether. The ethereal extracts were combined, washed with dilute hydrochloric acid, then with water, and dried. Removal of the solvent gave 0.8 gram of α-methyl-α,β-di-(p-hydroxyphenyl)-valeric acid, melting with decomposition at 225 degrees centigrade. The methyl, ethyl, and other lower-alkyl esters are obtained by esterifying the free acid by conversion of the acid to the acid chloride and reacting the acid chloride with the desired alcohol.

Various modifications may be made in the present invention without departing from the spirit or scope thereof, and it is to be understood that we limit ourselves only as defined in the appended claims.

We claim:
1. A compound of the formula:

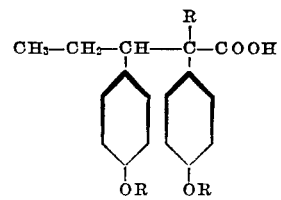

wherein R is a member of the group consisting of hydrogen and methyl radicals.

2. α-Methyl-α,β-di(p-hydroxyphenyl)-valeric acid.

3. α-Methyl-α,β-di-(p-methoxyphenyl)-valeric acid.

4. α,β-Di-(p-methoxyphenyl)-valeric acid.

5. In a method for the preparation of α,β-di-(p-methoxyphenyl)-valeric acid, the steps of mixing 4,4'-dimethoxy-α-cyanostilbene with an ethylmagnesium halide selected from the group consisting of ethylmagnesium bromide and ethylmagnesium chloride in ether solution; hydrolyzing the resulting α,β-di-(p-methoxyphenyl)-valeronitrile by heating with aqueous alkali; and, isolating α,β-di-(p-methoxyphenyl)-valeric acid from the reaction product.

6. In a method for the preparation of α-methyl-α,β-di-(p-hydroxyphenyl)-valeric acid, the steps of esterifying α,β-di-(p-methoxyphenyl)-valeric acid; mixing the ester with triphenylmethyl sodium to obtain an α-sodio-α,β-di-(p-methoxyphenyl)-valeric acid ester; mixing the sodio-salt with methyl iodide to methylate the α carbon atom; saponifying the ester with alkali; and, demethylating the methoxy groups to obtain α-methyl-α,β-di-(p-hydroxyphenyl)-valeric acid.

7. In a method for the transformation of 4,4'-dimethoxy-α-cyanostilbene to α-methyl-α,β-di-(p-hydroxyphenyl)-valeric acid, the steps of mixing 4,4'-dimethoxy-α-cyanostilbene with ethylmagnesium bromide in ether solution; hydrolyzing the resulting valeronitrile to $a,\beta$-di-(p-methoxyphenyl)-valeric acid by heating with aqueous alkali; esterifying the carboxy group of the acid to a carbalkoxy group; methylating the $a$-carbon atom with triphenylmethyl sodium and methyl iodide; saponifying the ester with alkali; demethylating the methoxy groups with pyridine hydrochloride; and isolating $a$-methyl-$a,\beta$-di-(p-hydroxyphenyl)-valeric acid from the reaction product.

JAMES H. HUNTER.
JEROME KORMAN.

REFERENCES CITED

The following references are of record in the file of this patent:

FOREIGN PATENTS

| Number | Country | Date |
|---|---|---|
| 559,024 | Great Britain | Feb. 1, 1944 |

OTHER REFERENCES

Mentzer et al., Comptes Rendus (Fr. Acad.), vol. 215, pages 554–556, (1942).

Silverman et al., J. Org. Chem., vol. 11, pp. 34–39, (1946).

Certificate of Correction

March 7, 1950

Patent No. 2,499,920 JAMES H. HUNTER ET AL.

It is hereby certified that errors appear in the printed specification of the above numbered patent requiring correction as follows:

Column 1, line 19, for "carbolkoxy" read *carbalkoxy radicals*; line 38, after the word "whereby" strike out the letter *a*; column 3, line 21, for "melting at 130–121" read *melting at 130–131*;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*